(12) United States Patent
Jehlicka

(10) Patent No.: US 9,223,320 B2
(45) Date of Patent: Dec. 29, 2015

(54) PRESSURE REGULATOR

(71) Applicant: GCE HOLDING AB, Malmo (SE)

(72) Inventor: Petr Jehlicka, Zdirec Nad Doubravou (CZ)

(73) Assignee: GCE HOLDING AB, Malmo (SE)

( * ) Notice: Subject to any disclaimer, the term of this patent is extended or adjusted under 35 U.S.C. 154(b) by 281 days.

(21) Appl. No.: 14/023,698

(22) Filed: Sep. 11, 2013

(65) Prior Publication Data
US 2014/0076428 A1 Mar. 20, 2014

(30) Foreign Application Priority Data
Sep. 14, 2012 (EP) .................................... 12184503

(51) Int. Cl.
*F16K 31/12* (2006.01)
*G05D 16/10* (2006.01)
*G05D 16/02* (2006.01)

(52) U.S. Cl.
CPC .............. *G05D 16/106* (2013.01); *G05D 16/02* (2013.01); *G05D 16/10* (2013.01); *Y10T 137/7801* (2015.04)

(58) Field of Classification Search
CPC ..... G05D 16/02; G05D 16/106; G05D 16/10; G05D 16/04; Y10T 137/7781; Y10T 137/7784; Y10T 137/7787; Y10T 137/7798; Y10T 137/7801
See application file for complete search history.

(56) References Cited

U.S. PATENT DOCUMENTS

| | | | | |
|---|---|---|---|---|
| 1,408,923 | A | * | 3/1922 | Bastian .................... 137/505.15 |
| 3,747,627 | A | | 7/1973 | Christie |
| 4,440,192 | A | * | 4/1984 | Donnelly et al. ............. 137/501 |
| 5,139,046 | A | | 8/1992 | Galli |
| 5,746,198 | A | * | 5/1998 | Taba et al. ................ 128/204.26 |
| 6,923,197 | B2 | * | 8/2005 | Vitale ............................. 137/12 |
| 7,341,073 | B2 | * | 3/2008 | Stradella et al. ......... 137/505.18 |

FOREIGN PATENT DOCUMENTS

| | | | |
|---|---|---|---|
| CN | 103672063 | * | 3/2014 |
| EP | 2708970 A1 | * | 3/2014 |
| GB | 785567 A | | 10/1957 |

OTHER PUBLICATIONS

European Search Report for EP 12184503.6, dated Jan. 25, 2013.

* cited by examiner

*Primary Examiner* — Jessica Cahill
(74) *Attorney, Agent, or Firm* — Harness, Dickey & Pierce, P.L.C.

(57) ABSTRACT

A pressure regulator includes a body having a gas inlet for a gas having an inlet pressure and a gas outlet for the gas having an outlet pressure lower than the inlet pressure and a passage connecting the outlet to the inlet. A regulator piston is arranged to control the outlet pressure of the gas by moving closer to and further away from a pressure regulator seat, and a regulating elastic element is arranged to bias the regulating piston in a direction away from the pressure regulator seat, against the force of gas at outlet pressure acting on the regulator piston in a direction towards the pressure regulator seat. The passage is fluidly connected to a floating piston, arranged to move in response to increased inlet pressure by compressing a stabilizing elastic element. The stabilizing elastic element is connected to the regulating elastic element via a connection element.

14 Claims, 7 Drawing Sheets

- Passages pressurized by inlet pressure
- Passages pressurized by outlet/reduced pressure

- Passages pressurized by inlet pressure
- Passages pressurized by outlet/reduced pressure

PRESSURE REGULATOR

PRIORITY STATEMENT

The present application hereby claims priority under 35 U.S.C. §119 to European patent application number EP 12184503.6 filed Sep. 14, 2012, the entire contents of which are hereby incorporated herein by reference.

FIELD

At least one embodiment of the invention generally relates to the field of pressure regulators for compressed gases. In particular, it relates to a pressure regulator with improved stability of outlet pressure.

BACKGROUND

Pressure regulators are employed in many different applications when a source of compressed gas is connected to a device which uses the compressed gas for different purposes A common principle in a pressure regulator is that the inlet pressure is reduced on a regulator seat by an actuator or regulator piston. The regulator piston sets a clearance at the seat to achieve an outlet pressure defined by a force from a regulating elastic element. The regulator piston is loaded by the following forces: the force from the area pressurized by the inlet pressure, the force from the regulating elastic element, the force from the area pressurized by the outlet pressure, the reaction force from the regulator seat—in case the piston is in contact with the seat—and friction forces affecting the piston. In each regulator state all these forces are in balance, meaning that when the force resulting from the area pressurized by inlet pressure changes—e.g. as gas in the cylinder is consumed and the inlet pressure changes—the force resulting from the area pressurized by the outlet pressure changes as well. This is even more noticeable in pressure regulators for high flow capacity since they require a large boring of the seat which further increases the force resulting from the area pressurized by the inlet pressure. This described characteristic is usually referred to as the irregularity or stability of a pressure regulator. For the pressure outlet usability it is important to minimize the influence of the inlet pressure changes as much as possible since outlet pressure changes can negatively affect the performance of the devices connected to the pressure outlet.

SUMMARY OF THE INVENTION

In view of the above, it is thus an object of the present invention to provide an improved pressure regulator which reduces the outlet pressure dependence on the inlet pressure changes in order to achieve better stability of the pressure outlet of the pressure regulator without increasing size of pressure regulator. A further object of the present invention is to allow adjustment of each produced regulator to one reference outlet pressure to eliminate production tolerances of pressure regulator components.

According to the invention, the above and further objects are achieved by the provision of a pressure regulator according to claim 1. More specifically, the pressure regulator comprises a body having a gas inlet for a gas having an inlet pressure, a gas outlet for the gas having an outlet pressure lower than the inlet pressure and a passage connecting the outlet to the inlet, further comprising a regulator piston arranged in the body to control the outlet pressure of the gas by moving closer to and further away from a pressure regulator seat, and a regulating elastic element arranged to bias the regulating piston in a direction away from the pressure regulator seat, against the force of gas at outlet pressure acting on the regulator piston in a direction towards the pressure regulator seat, wherein the passage is fluidly connected to a floating piston, wherein the floating piston is arranged to move in response to increased inlet pressure by compressing a stabilizing elastic element, such that an increase in the force of the gas under inlet pressure acting on the floating piston is matched by an increase in the force of the stabilizing elastic element acting on the floating piston, wherein the stabilizing elastic element is connected to the regulating elastic element via a connection element arranged so that the compression of the stabilizing elastic element results in a decompression of the regulating elastic element.

The provision of a floating piston in this manner increases the stability of the pressure regulator and allows a more stable outlet pressure as the floating piston compensates for changes in the inlet pressure which otherwise could affect the outlet pressure.

The passage may be fluidly connected to a chamber arranged in the body, and the floating piston having an inner cavity forming at least part of the chamber such that the size of the chamber is adjustable, and preferably increased, by means of the floating piston, in response to a change in inlet pressure. This provides an efficient and easily implemented way of compensating the fluctuations in the inlet pressure by the floating piston.

The connection element may comprise at least one pin extending through an elongate boring in the body, and being at a first end in contact with the regulating elastic element and at a second end in contact with the stabilizing elastic element, in particular via the floating piston. This provides a simple and efficient way of transferring forces and or movement between the stabilizing elastic element and the regulating elastic element.

Conveniently, the connection element comprises three rigid pins extending through three respective elongate borings in the body, which gives a good stability of the connection.

The stabilizing elastic element and the floating piston may be arranged in a housing which is connected to the body and which is displaceable for adjusting initial compression of the stabilizing elastic element. This provides a simple and efficient way of setting the initial compression of the stabilizing elastic element and in this way allow adjustment of each pressure regulator to a set reference outlet pressure and reduce the dependence on production tolerances of the components.

The housing may comprise a vent for providing venting of a clearance space between the housing and the floating piston. In this way it is possible to reduce the risk for contaminating the pressure regulator by water or any impurities from an external source. The vent may also be used for detecting possible leaks along seals in the pressure regulator.

The housing may be connected to the body by a screwed connection.

The housing may comprise a guide for guiding the floating piston in a longitudinal direction of the housing, the longitudinal direction of the housing corresponding to a direction of length change of the stabilizing and the regulating elastic elements during compression and decompression. The guide may be in the form of a sleeve fixed in a longitudinal direction of the housing and enclosing and slidably guiding an end portion of the floating piston, such that the floating piston is allowed to move only in a longitudinal direction of the housing. In this way the floating piston movement is stabilized and the function of the pressure regulator is further improved.

When a vent is provided, the sleeve may be arranged surrounding the vent, and the floating piston may comprise through holes for providing fluid contact between the clearance space and the vent. This further improves the possibilities for venting the clearance space.

The regulator piston may comprise a through-hole adapted for letting a gas flow, at the outlet pressure, pass through the regulator piston and into a closed space arranged behind the regulator piston, adjacent to an end of the regulator piston distal to the pressure regulator seat, such that gas at the outlet pressure is allowed to act on the distal end of the regulator piston, in a direction towards the pressure regulator seat. The through-hole may comprise at least one radial opening adjacent to the end of the regulator piston proximal to the pressure regulator seat, and an axial boring through the regulator piston, the boring being connected to the at least one radial opening.

The regulating elastic element and the stabilizing elastic element may be in the form of springs.

Generally, all terms used in the claims are to be interpreted according to their ordinary meaning in the technical field, unless explicitly defined otherwise herein. All references to "a/an/the opening" are to be interpreted openly as referring to at least one instance of said opening, unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
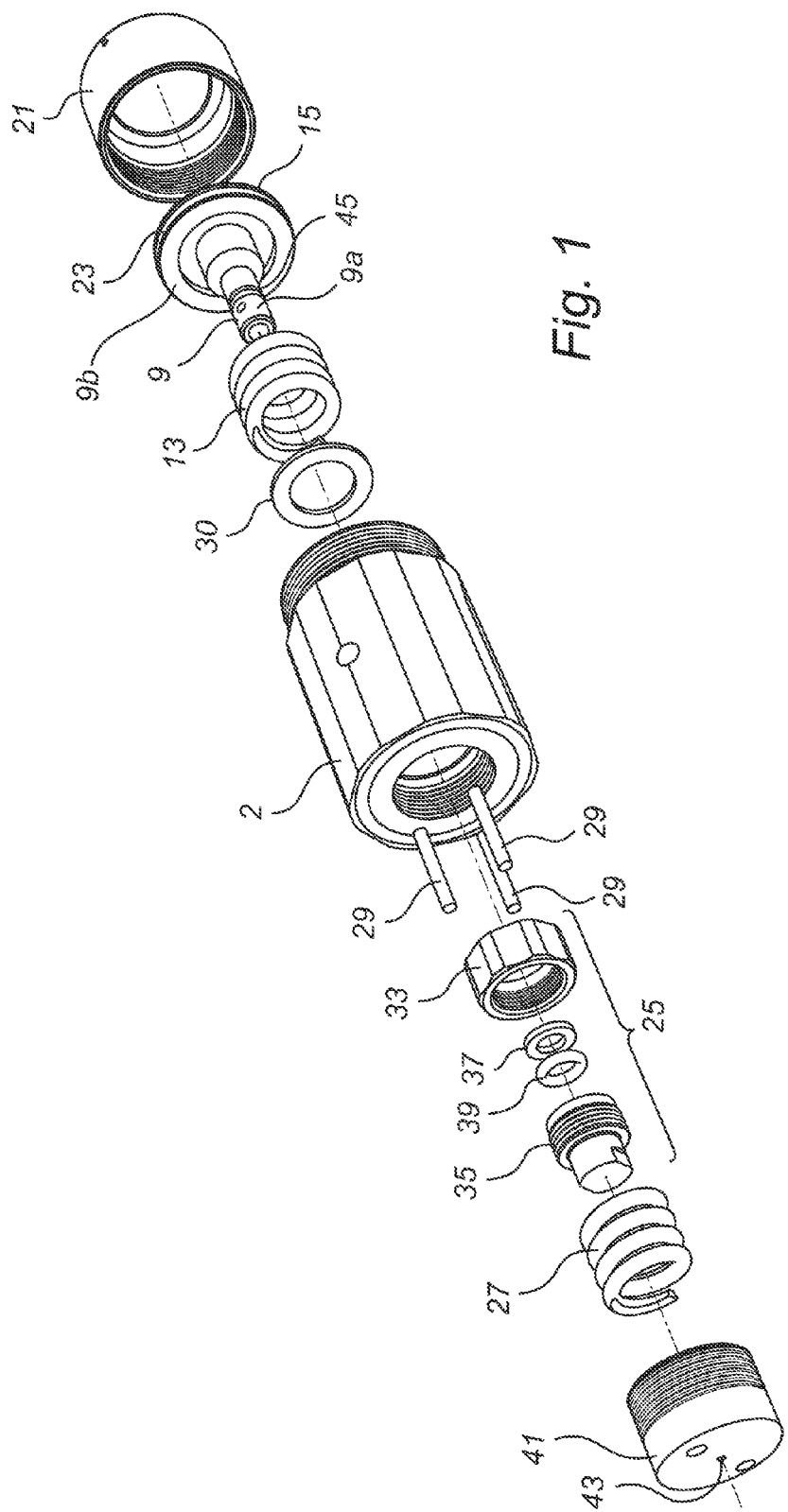
FIG. 1 is an exploded view of a pressure regulator.
Figure 2:
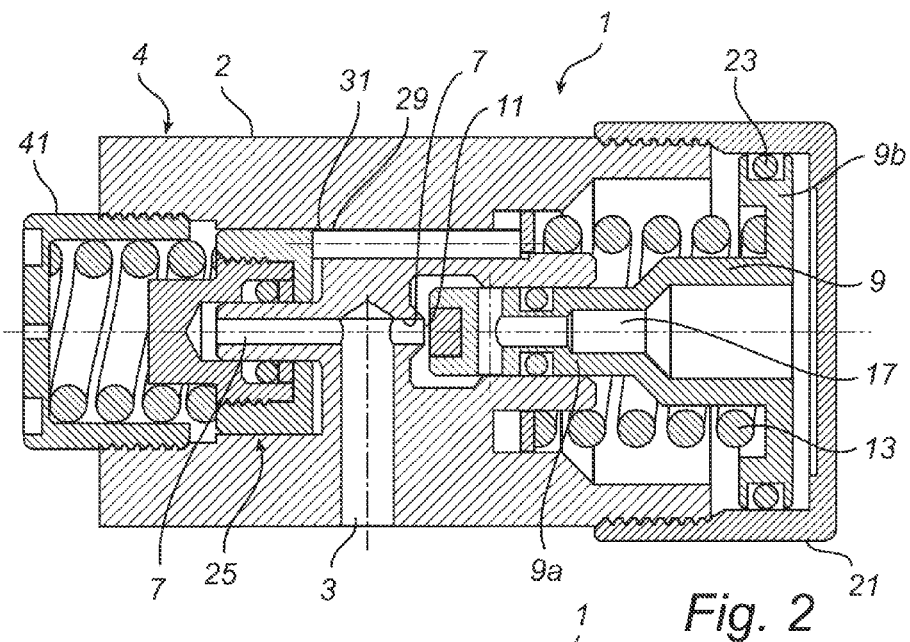
FIG. 2 is a sectional view of the pressure regulator.
Figure 3:
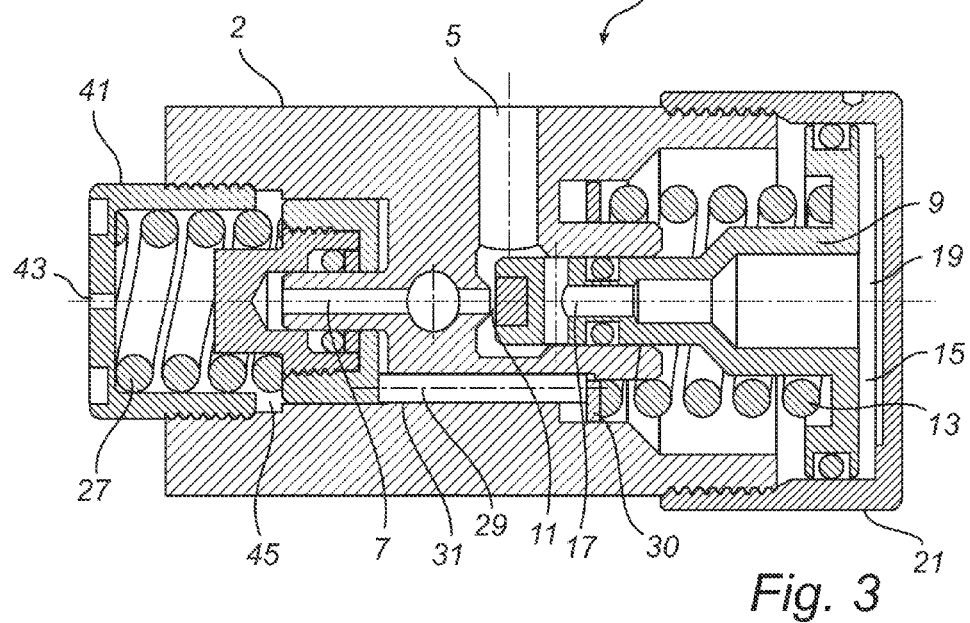
FIG. 3 is another sectional view of the pressure regulator.

FIG. 1-3 show a pressure regulator 1 having a body 2 with an inlet 3 for gas having an inlet pressure and an outlet 5 for gas at an outlet pressure lower than the inlet pressure. The gas is typically a compressed gas which is provided from the outlet 5 at a determined outlet pressure to devices using compressed gas at a certain pressure for various purposes.

The inlet 3 is connected to a source of compressed gas, such as a gas cylinder. A passage 7 connects the inlet 3 to a pressure regulator seat 11, and to a stabilizing mechanism 4. The pressure regulator is arranged for providing a more or less constant outlet pressure of the gas at the outlet 5, largely independent on changes in the inlet pressure.

This is achieved by the pressure regulator 1 comprising a stabilizing mechanism with a regulating piston 9, which is arranged at a pressure regulator seat 11, and which controls the pressure drop at the pressure regulator seat 11 by moving closer to or further away from the seat. A regulating elastic element 13, in the form of a regulating spring 13 is mounted in the pressure regulator biasing the regulating piston 9 in a direction away from the pressure regulator seat 11.

Figure 5B:
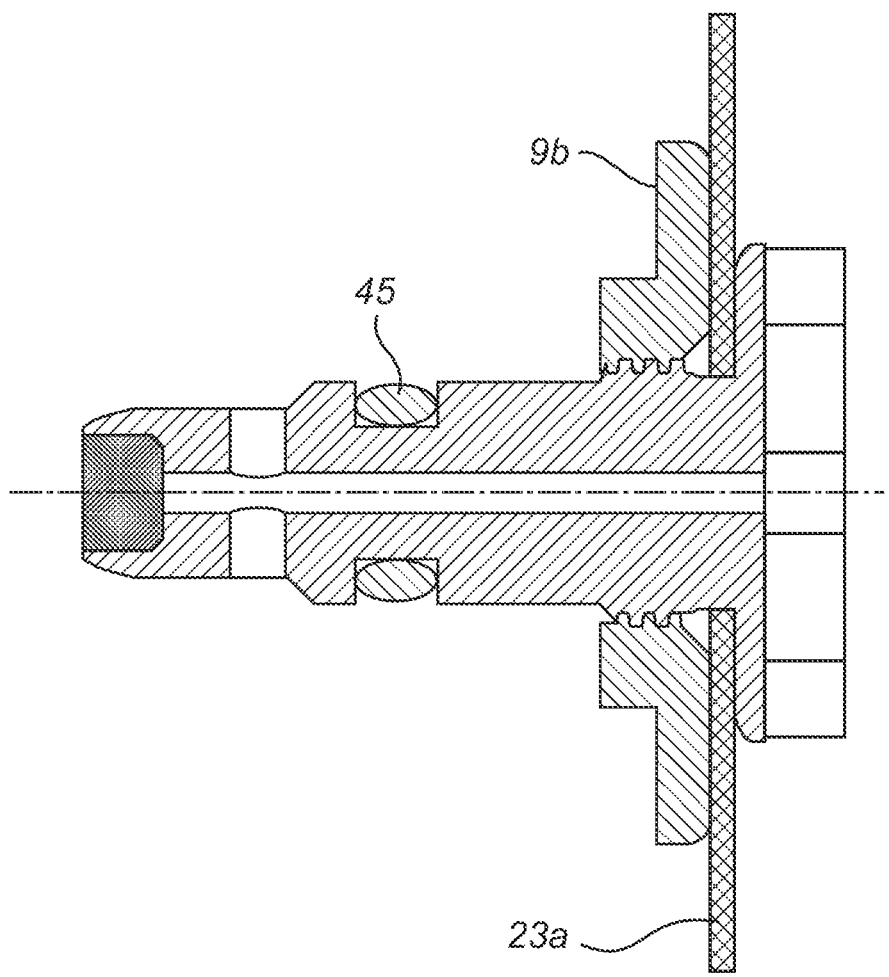
Figure 6A:
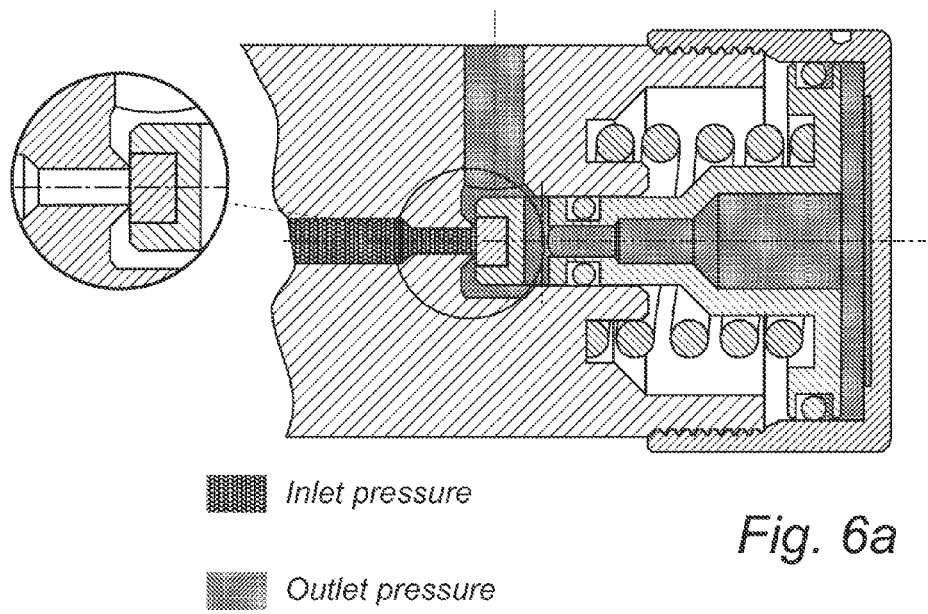
FIGS. 6a and 6b show two positions of another pressure regulator.
Figure 6B:
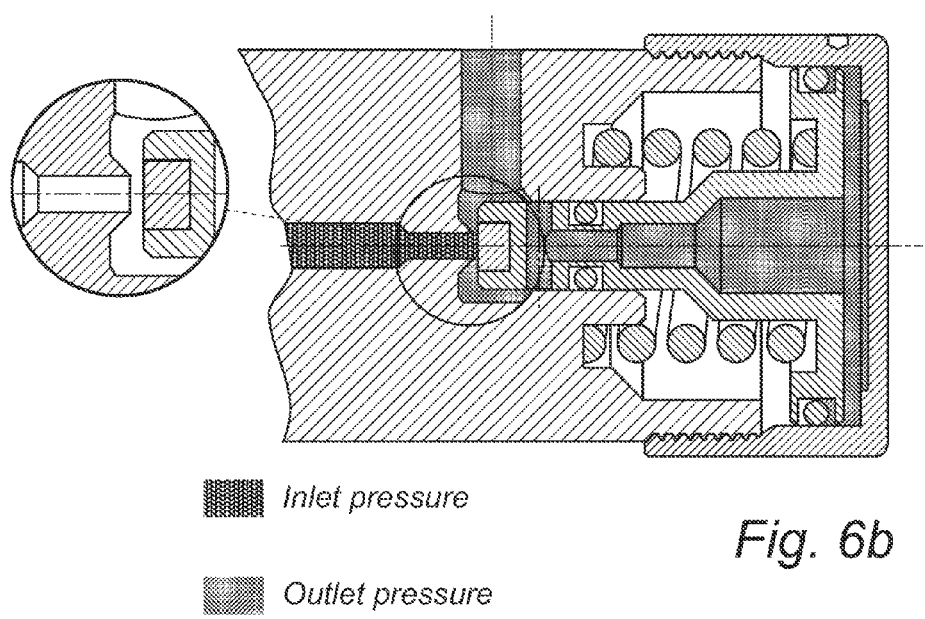
Figure 7:
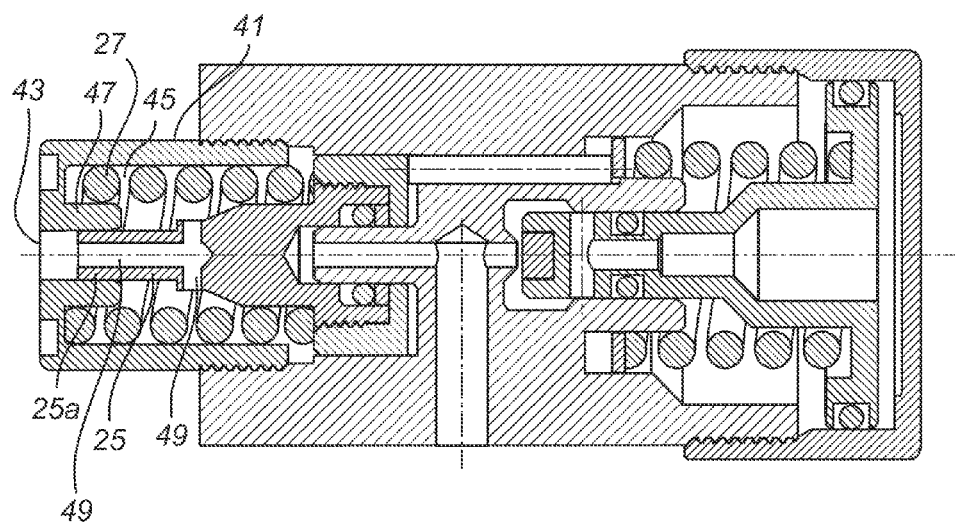
FIG. 7 shows a detail of a variant of the pressure regulator stabilizing mechanism.

Apart from the biasing force of the regulating spring 13 acting on the regulating piston 9, a force from gas at the outlet pressure also acts on the regulating piston 9 at an end 15 of the regulating piston 9 distal to the pressure regulator seat 11. A through-hole 17 is arranged in the regulating piston 9 for letting gas pass through the regulating piston 9 and into the closed space 19 between the distal end 15 and the part of the body 2 behind the distal end 15. It may be noted that this part of the body 2 may be in the form of a removable plug 21. A seal 23 is arranged for sealing the closed space 19. This seal is shown in the shape of an O-ring, but it would also be possible to use other options, such as a flexible membrane 23a, as shown in the sectional view in FIG. 5b As may be seen in FIG. 1, the regulating piston comprises a first elongate portion 9a which is attached to or continues to a flat portion 9b of larger diameter which is ended by the distal end 15. In addition, a force from the gas at inlet pressure also acts on the regulating piston 9 through the passage 7. This is also illustrated in FIGS. 6a and 6b, wherein, in FIG. 6a the pressure regulator is closed for gas passing from the inlet to the outlet and in FIG. 6a the passage is open. As is shown in the detailed views this is accomplished by the regulating piston moving away from and into contact with and closing the pressure regulator seat 11.

Figure 5A:
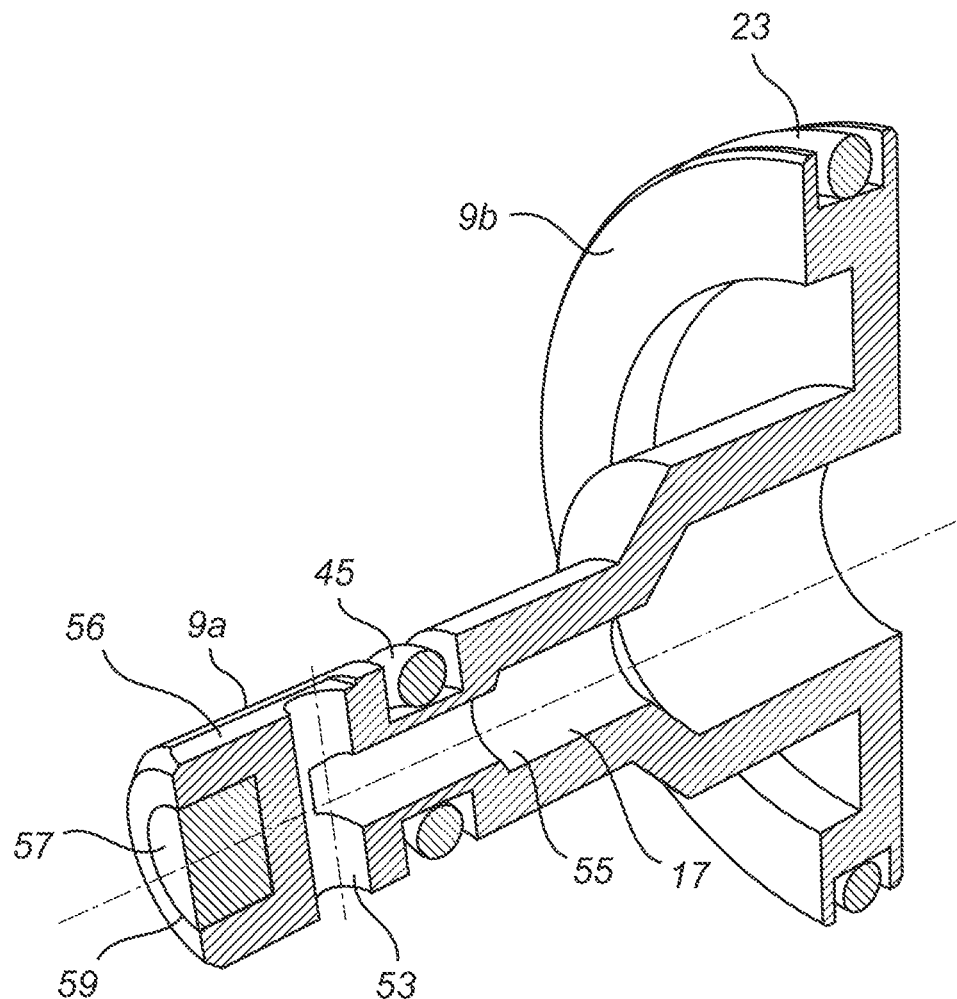
FIGS. 5a and 5b show detailed sectional views of a regulating piston.

A detailed view of an embodiment of the regulating piston 9 is shown in FIG. 5a. As mentioned above the regulating piston 9 comprises a through hole 17 with one or more radial openings 53 adjacent to the end of the regulator piston 9 proximal to the pressure regulator seat 11, an axial boring 55 extending through the regulator piston 9, and flats 56 allowing gas to reach the radial openings 53 via clearance between the flats 56 and the regulator body 2. The through hole 17 allows gas at outlet pressure pass through the regulator and into the closed space 19. A seat seal 57 may be arranged in a blind gap 59 at the end of the regulating piston 9 proximal to the pressure regulator seat 11. The blind gap 59 may have an inner barb for holding the seat seal 57 in place.

The regulating piston 9, or more accurately the regulating spring 13, is in operative contact with a floating piston 25, which is arranged to move in response to an increase or decrease in inlet pressure at the inlet 3. Expressed differently, the passage 7 is fluidly connected to the floating piston 25, in such a way that when the inlet pressure is increased, the floating piston 25 moves by compressing a stabilizing elastic element 27 in the form of a stabilizing spring 27, and thereby effectively increases the length of the regulating spring 13. Or in yet other words, an increase in the force of the gas under inlet pressure acting on the floating piston 25 from the inlet 3 through the passage 7 is matched by an increase in the force of the spring 27 acting on the floating piston 25 as the spring 27 is compressed. By designing the pressure regulator as described herein a theoretical change of outlet pressure based on inlet pressure change is compensated by a change in regulator spring force which in turn improves the stability of the pressure regulator.

Figure 4A:
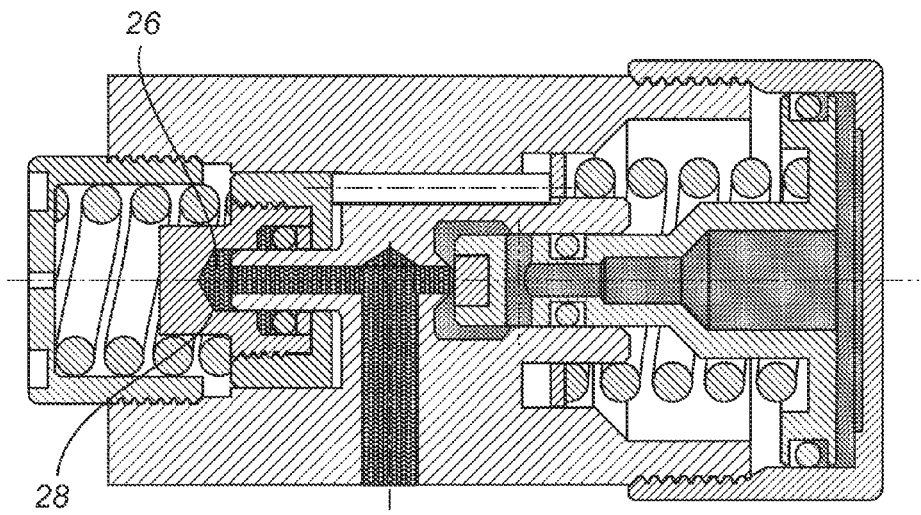
FIGS. 4a and 4b illustrate the pressures present in the pressure regulator.
Figure 4B:
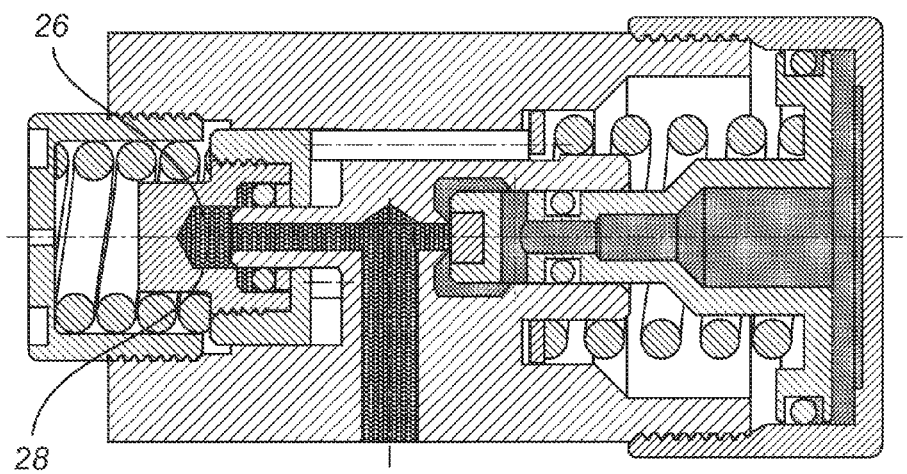

FIGS. 4a and 4b further illustrate how the inlet pressure and the outlet pressure act on the different parts of the pressure regulator. As is shown, the passage 11 is fluidly connected to a chamber 26 arranged in the body 2, and the floating piston has an inner cavity 28 which forms at least part of the chamber 26 such that the size of the chamber 26 is adjustable by means of the floating piston 25, in response to a change in inlet pressure.

For comparison, FIGS. 6a and 6b show how the inlet pressure and the outlet pressure act on different parts of a pressure regulator not according to the embodiments of the present invention. This pressure regulator is showed in a closed position in FIG. 6a and in an open position in FIG. 6b.

The connection between the floating piston 25 and the regulating spring 13 is achieved by a number of rigid pins 29 extending through the body 2 in elongate borings 31. Practical considerations have proven three pins to be a suitable number for achieving a stable connection. More pins could also be used, and it may be possible also to use fewer than three. A washer 30 may be arranged between the regulating spring 13 and the pins 29 for further improving the stability of the connection between the pins 29 and the regulating spring 13.

As is most clearly seen in FIG. 1, the floating piston 25 comprises a sleeve part 33 partly enclosing an inner part 35. The sleeve part 33 may have an inner thread so that it may be attached by screwing onto an outer thread of the inner part 35. The floating piston 25 includes a back-up ring 37 and a seal 39 for the gas-tightness of the floating piston 25.

The floating piston is arranged in a housing 41, which may be attached to the body 2 by a screwed connection. The axial length of the regulating spring 13 is set by the positioning of the housing in relation to the body. This position may be set e.g. by an operator to a position which provides a suitable size of the regulator spring 13 adapted to the pressure outlet reference value of the pressure regulator. In this way it is possible to allow adjustment of each pressure regulator to a set reference outlet pressure and reduce the dependence on production tolerances of the components.

The housing 41 includes a central vent 43 which is arranged for providing venting of a clearance space 45 which is present between the floating piston 25 and the housing 41. The vent 43 also ensures venting of the space around the regulator piston 9 via the clearance of the pins 29 in the borings 31. The vent 43 can be fit to any size of plug to reduce the risk of contaminating the internal space of the regulator by water or any impurities from an external source. In addition the vent 43 may be used for leakage detection along the seals included in the pressure regulator, such as the seal 39 in the floating piston, the seal 23 arranged at the regulator piston 9 and additional seals such as a seal 45 arranged at the regulator piston part 9a.

According to a variant of the pressure regulator, a guide for the floating piston 25 may be provided in the housing 41 for ensuring that the floating piston 25 only moves in the longitudinal direction of the housing 41. This guide may e.g. be in the form of a sleeve 47 arranged around the vent 43 and enclosing and slidably guiding an end portion 25a of the floating piston 25. The floating piston 25a may then also include through holes 49 for providing fluid contact between the clearance space around the floating piston 25 and the vent 43.

It will be appreciated that a person skilled in the art can modify the above-described embodiments in many ways and still use the advantages of the invention as shown in the embodiments above. Thus, the invention should not be limited to the shown embodiments but should only be defined by the appended claims.

The invention claimed is:

1. A pressure regulator comprising
a body having
a gas inlet for a gas having an inlet pressure,
a gas outlet for the gas having an outlet pressure lower than the inlet pressure and
a passage connecting the outlet to the inlet,
a regulator piston arranged in the body to control the outlet pressure of the gas by moving closer to and further away from a pressure regulator seat,
a regulating elastic element arranged to bias the regulating piston in a direction away from the pressure regulator seat, against the force of gas at outlet pressure acting on the regulator piston in a direction towards the pressure regulator seat,
wherein
the passage is fluidly connected to a floating piston, wherein the floating piston is arranged to move in response to increased inlet pressure by compressing a stabilizing elastic element, such that an increase in the force of the gas under inlet pressure acting on the floating piston is matched by an increase in the force of the stabilizing elastic element acting on the floating piston,
wherein the stabilizing elastic element is connected to the regulating elastic element via a connection element arranged so that the compression of the stabilizing elastic element results in a decompression of the regulating elastic element.

2. The pressure regulator of claim 1, wherein the regulating elastic element and the stabilizing elastic element are in the form of springs.

3. The pressure regulator of claim 1, wherein the passage is fluidly connected to a chamber arranged in the body, the floating piston having an inner cavity forming at least part of the chamber such that the size of the chamber is adjustable by means of the floating piston, in response to a change in inlet pressure.

4. The pressure regulator of claim 3, wherein the size of the chamber is increased in response to increased inlet pressure.

5. The pressure regulator of claim 1, wherein the connection element comprises at least one pin extending through an elongate boring in the body, and being at a first end in contact with the regulating elastic element and at a second end in contact with the stabilizing elastic element, in particular via the floating piston.

6. The pressure regulator of claim 5, wherein the connection element comprises three rigid pins extending through three respective elongate borings in the body.

7. The pressure regulator of claim 1, wherein the regulator piston comprises a through-hole adapted for letting a gas flow, at the outlet pressure, pass through the regulator piston and into a closed space arranged behind the regulator piston, adjacent to an end of the regulator piston distal to the pressure regulator seat, such that gas at the outlet pressure is allowed to act on the distal end of the regulator piston, in a direction towards the pressure regulator seat.

8. The pressure regulator of claim 7, wherein the through-hole comprises
at least one radial opening adjacent to the end of the regulator piston proximal to the pressure regulator seat, and
an axial boring through the regulator piston, the boring being connected to the at least one radial opening.

9. The pressure regulator of claim 1, wherein the stabilizing elastic element and the floating piston are arranged in a housing which is connected to the body and which is displaceable for adjusting initial compression of the stabilizing elastic element.

10. The pressure regulator of claim 9, wherein the housing comprises a vent for providing venting of a clearance space between the housing and the floating piston.

11. The pressure regulator of claim 9, wherein the housing is connected to the body by a screwed connection.

12. The pressure regulator of claim 9, wherein the housing comprises a guide for guiding the floating piston in a longitudinal direction of the housing, the longitudinal direction of the housing corresponding to a direction of length change of the stabilizing elastic element and the regulating elastic element during compression and decompression.

13. The pressure regulator of claim 12, wherein the guide is in the form of a sleeve fixed in a longitudinal direction of the housing and enclosing and slidably guiding an end portion of the floating piston, such that the floating piston is allowed to move only in a longitudinal direction of the housing.

14. The pressure regulator of claim 13, wherein the housing comprises a vent for providing venting of a clearance space between the housing and the floating piston and wherein the sleeve is arranged surrounding the vent, and wherein the floating piston comprises through holes for providing fluid contact between the clearance space and the vent.

\* \* \* \* \*